June 21, 1960 B. F. SCHMIDT 2,941,747
FISHING LINE REEL
Filed Sept. 1, 1954 3 Sheets-Sheet 1
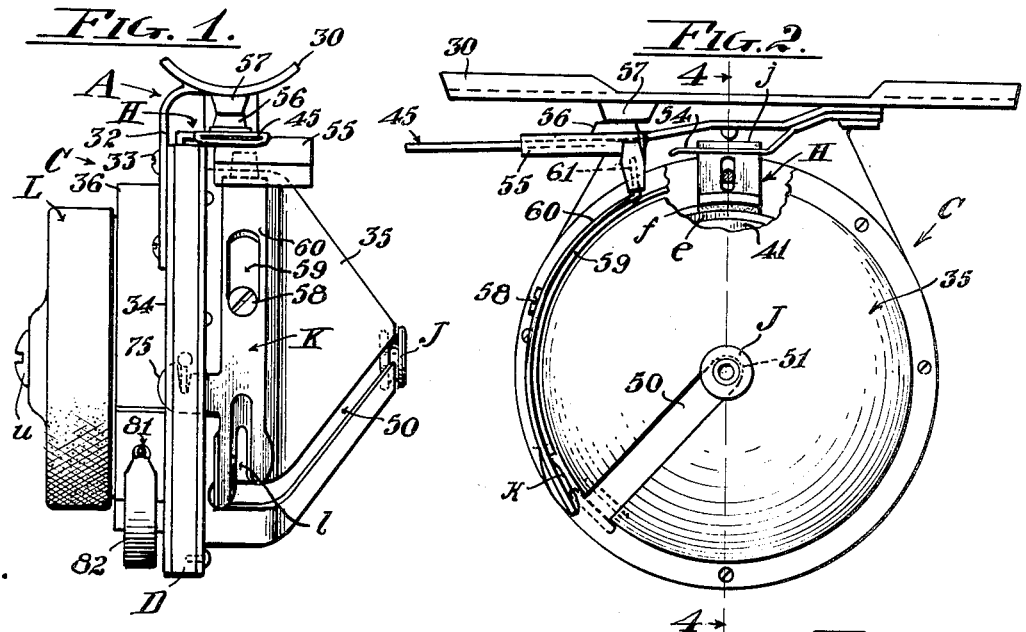
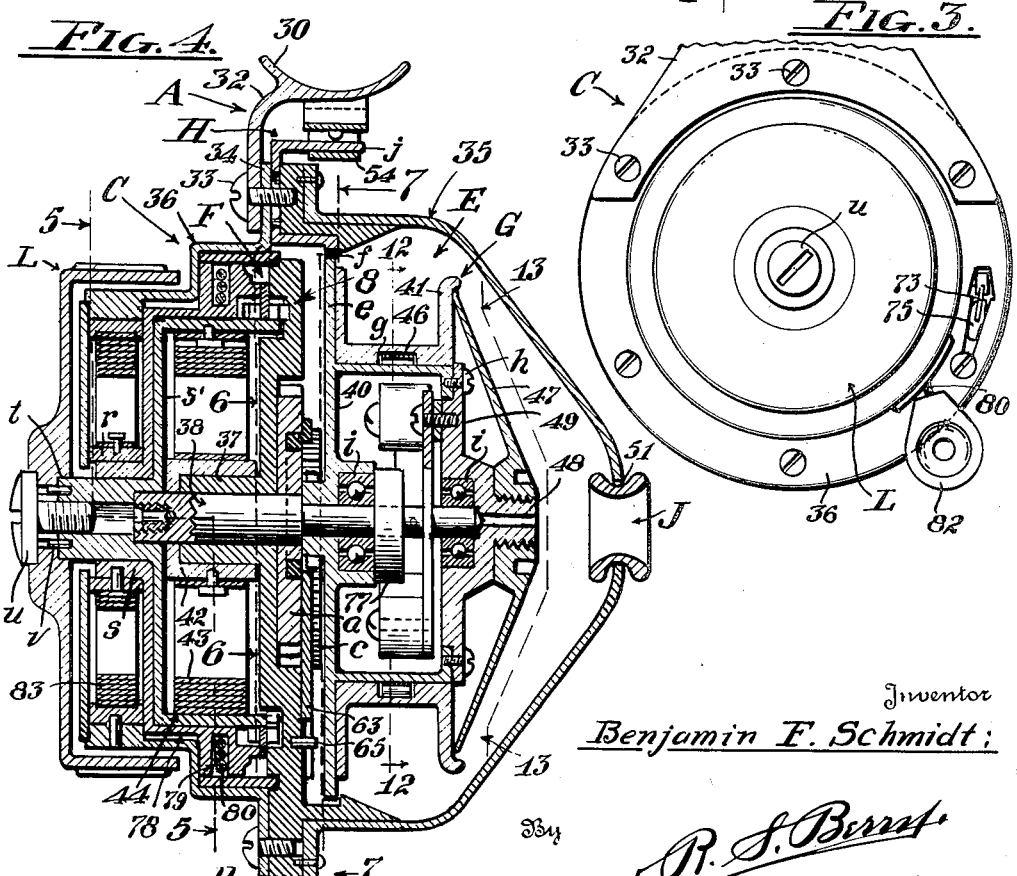
Inventor
Benjamin F. Schmidt;
By
R. S. Bernt
Attorney June 21, 1960 B. F. SCHMIDT 2,941,747
FISHING LINE REEL
Filed Sept. 1, 1954 3 Sheets-Sheet 2
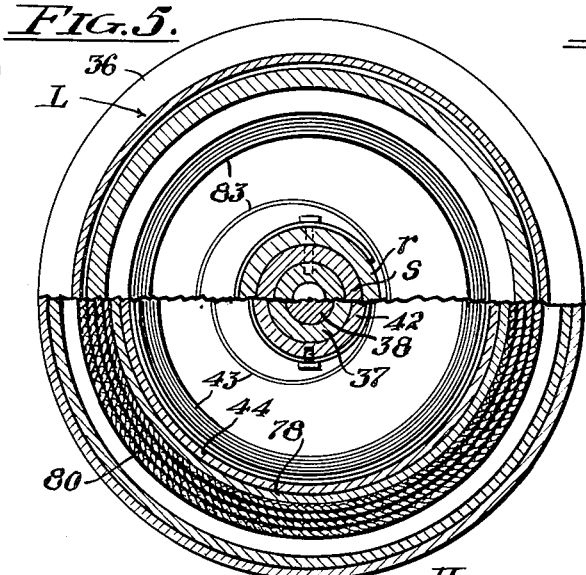
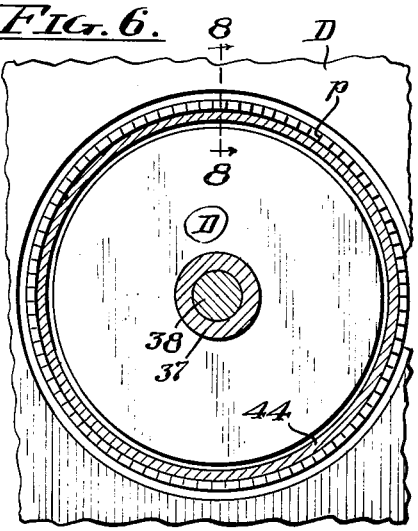
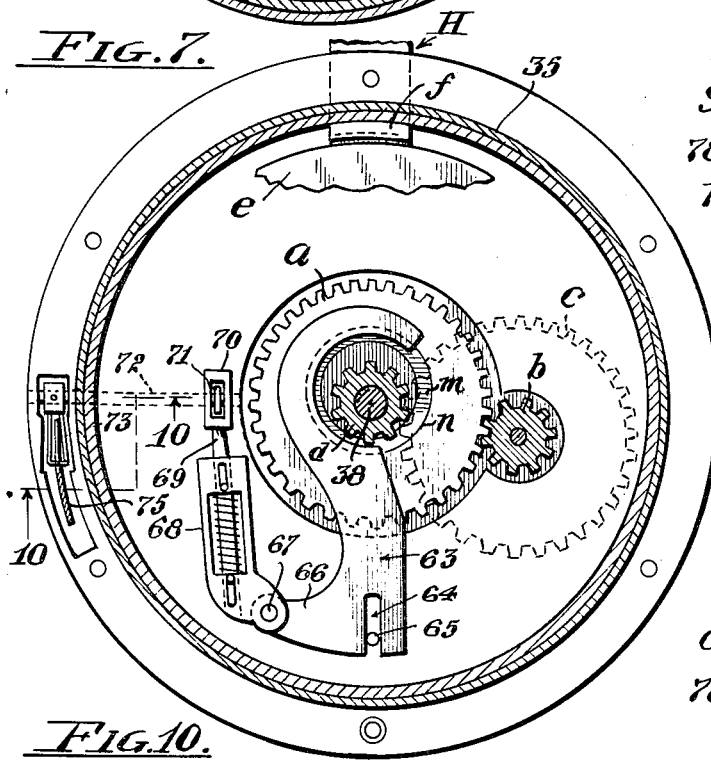
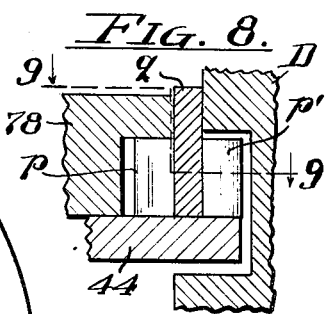
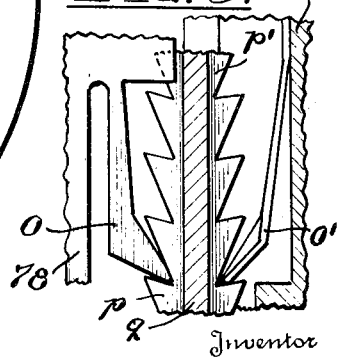
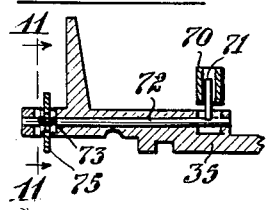
Inventor
Benjamin F. Schmidt
By R. S. Burns
Attorney June 21, 1960 B. F. SCHMIDT 2,941,747
FISHING LINE REEL
Filed Sept. 1, 1954 3 Sheets-Sheet 3
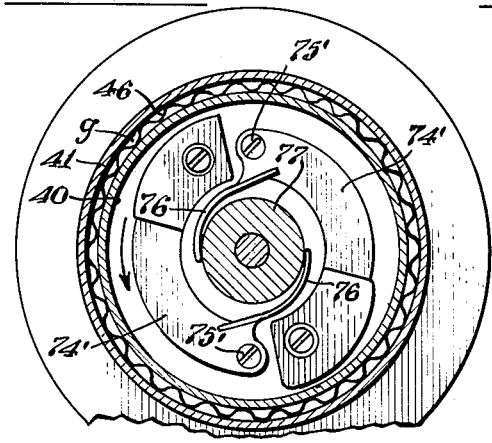
FIG. 12.
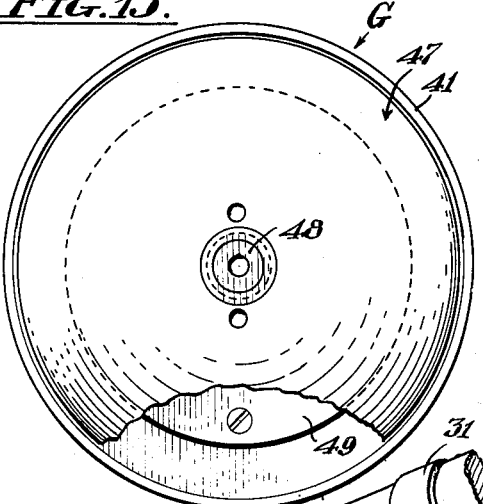
FIG. 13.
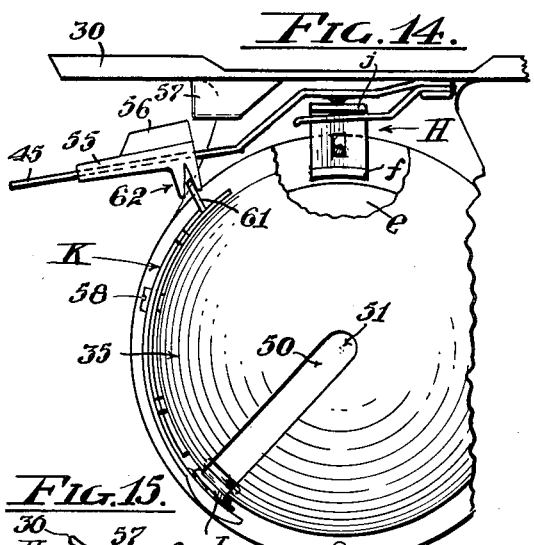
FIG. 14.
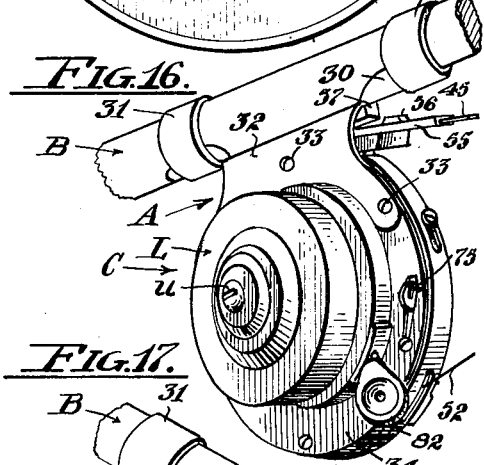
FIG. 16.
FIG. 17.
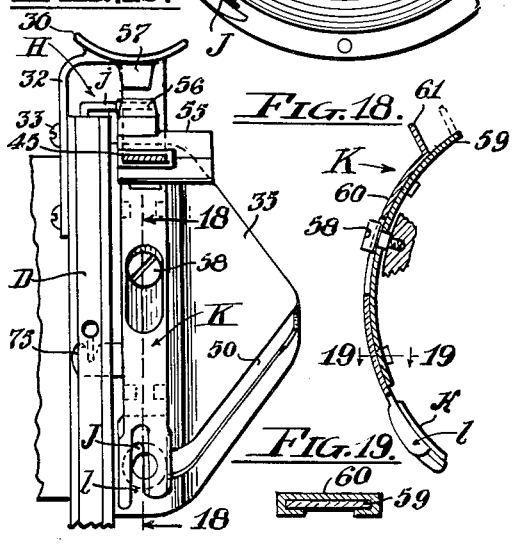
FIG. 15.
FIG. 18.
FIG. 19.
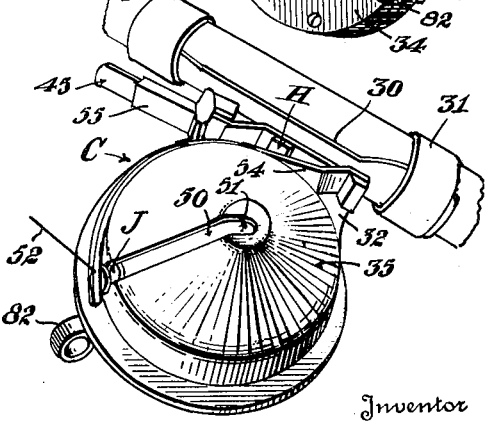
Inventor
Benjamin F. Schmidt;
By R. S. Bent
Attorney

United States Patent Office 2,941,747
Patented June 21, 1960

2,941,747

FISHING LINE REEL

Benjamin F. Schmidt, Los Angeles, Calif.
(450 Fairview Ave., Sierra Madre, Calif.)

Filed Sept. 1, 1954, Ser. No. 453,560

10 Claims. (Cl. 242—84.21)

This invention relates to a fishing line reel and has as its primary object the provision of a reel which is so constructed that it may be utilized in a casting operation wherein the line passes off the end of the reel without turning the latter and also used as a conventional fly reel in effecting a straight forward or direct line rewinding operation.

A particular operation of the invention is the provision of a means whereby the reel may be readily conditioned for either the casting or rewinding operation which involves positioning the line for unwinding from the end of the reel and coincidently holding the reel stationary and also involves positioning the line for rewinding of the line onto the reel by rotation of the latter.

Another object is to provide a construction in a fishing reel of the above character whereby the rewinding operation may be accomplished by either of several types of the winding mechanism.

A further object is to provide in a reel of the type having an extended cover formed with a slot leading from the base to the outer or apex portion of the cover along which the line is directed back and forth between the casting and rewinding positions, and in which the line is conveyed by means of an eyelet or grommet through which it is passed whereby possible entanglement of the line in the reel cover, by reason of the shifting thereof to and from the casting position, is obviated.

With the foregoing objects in view together with such other objects and advantages as may subsequently appear, the invention resides in the parts and in the combination, construction and arrangement of parts hereinafter described and claimed, and illustrated by way of example in the accompanying drawings in which:

Fig. 1 is a view in side elevation of the fish line reel showing a preferred embodiment of the invention with the parts disposed in the casting positions;

Fig. 2 is a view of the reel shown in Fig. 1 as seen in front elevation;

Fig. 3 is a view of same in rear elevation with portions removed;

Fig. 4 is an enlarged vertical section as seen on the line 4—4 of Fig. 2;

Fig. 5 is a view as seen on the line 5—5 of Fig. 4 in the direction indicated by the arrows;

Fig. 6 is a detail in section taken on the line 6—6 of Fig. 4;

Fig. 7 is a view in section and elevation taken on the line 7—7 of Fig. 4;

Fig. 8 is an enlarged view in cross section of the portion of the structure shown in Fig. 4 indicated by the arrow 8;

Fig. 9 is a detail in horizontal section taken on the line 9—9 of Fig. 8;

Fig. 10 is a detail in section as viewed on the line 10—10 of Fig. 7;

Fig. 11 is a view in section and elevation as seen on the line 11—11 of Fig. 10 with portions removed;

Fig. 12 is a view in section and elevation taken on the line 12—12 of Fig. 4 as seen in the direction indicated by the arrows with parts broken away;

Fig. 13 is a view in elevation as seen on the line 13—13 of Fig. 4 with portions broken away;

Fig. 14 is a view in front elevation similar to Fig. 2 showing the parts as disposed in the line winding position;

Fig. 15 is a view in side elevation of the structure shown in Fig. 14;

Fig. 16 is a perspective view of the reel as seen from the back thereof showing it as applied;

Fig. 17 is a perspective view of the reel as seen from the front thereof showing it as applied;

Fig. 18 is a fragmentary detail view taken on the line 18—18 of Fig. 15, and

Fig. 19 is a detail in cross section taken on the line 19—19 of Fig. 18.

Referring to the drawings more specifically A indicates generally the reel support for attaching the reel to a fishing pole B in a conventional fashion as particularly shown in Figs. 16 and 17, the reel support A embodying a saddle portion 30 adapted to seat on the fishing pole and to be affixed thereto at its ends by slip rings 31 in the usual manner.

Formed on the saddle 30 is a bracket 32 which is detachably affixed as by screws 33 to an annular marginal flange 34 of a reel housing C. In the forms of the invention shown in Figs. 1 to 19 the housing marginal flange 34 has mounted thereon a central supporting wall D which partitions the reel housing into front and rear compartments E and F of which the front compartment E is enclosed by an elongated cover 35 while the rear compartment F is enclosed by a housing 36 on which the marginal flange 34 is formed. The partition wall D is formed with an axial tubular extension 37 projecting into the compartment F through which extends a revoluble shaft 38 the forward end portion of which leads into the compartment E forward of the wall D and has revolubly supported thereon a spool G embodying a drum 40 on the periphery of which is slidably supported a line receiving channeled annulus 41.

The other end portion of the shaft 38 projects into the compartment F and has affixed thereto a sleeve 42 which encompasses the tube 37 and has affixed thereto one end of a spiral spring 43 the other end of which is attached to a winding drum 44 rotatable in one direction only, as will later be described, to wind the spring 43 and place it under tension whereby it will act on the sleeve 42 to drive the shaft 38 and the spool G in a direction to effect winding of a line on the latter. In the construction shown in Figs. 1 to 19 inclusive the spool G is driven from the shaft 38 through a gear train comprising a spur gear $a$ fixed on the shaft 38 which, as shown in Fig. 7, meshes with a pinion $b$ fixed on a spur gear $c$ which in turn meshes with a pinion $d$ fixed on the back of a cylindrical disk $e$ constituting the back wall of the drum 40 and which disk $e$ parallels the wall D and extends outwardly beyond the drum 40 and also slightly beyond the line receiving annulus 41. The outer periphery of the disk $e$ constitutes a brake drum and is subject to being frictionally engaged by an arcuate shoe $f$ of a normally spring applied manually controlled brake H slidably mounted and guided between the flange 34 and the upper portion of the wall D and actuated by a lever 45 carried on the saddle 30 as will be hereinafter described.

The annulus 41 of the spool G is frictionally engaged with the drum 40 through the medium of a tensioned annular serpentine or marcelle spring 46 seated in a channel $g$ formed in the inner periphery of the annulus 41 and bearing against the outer periphery of the drum 40; the annulus 41 being further frictionally engaged by the margin of a tapered disk 47 axially screwed on a threaded boss 48 formed on an end plate 49 detachably mounted by screws $h$ on the outer end of the drum 40. The plate 49 and the disk $e$ constituting the front and back walls respectively of the drum 40, are supported on the outer end portion of the shaft 38 through the medium of ball bearings $i$ and $i'$ as particularly shown in Fig. 4.

The cover 35 enclosing the compartment E and encompassing the spool G is formed with a radially extending slot 50 leading from the inner marginal portion of the cover to the outer central part of the latter where it terminates in a segmental end portion 51 positioned axially of the cover in axial alignment with the spool G. In the forms of the invention shown in Figs. 1 to 19 a grommet J is slidably supported in the slot 50 for movement between the inner and outer ends thereof. A fishing line 52, shown in Figs. 16 and 17, is wound on the annulus 41 of the spool G and affixed thereto in the usual manner, which line is passed through the grommet J. An important feature of the invention resides in the provision of the grommet J as a guide for the line 52 both when positioned at the inner and outer ends of the slot 50 and in translation of the line laterally along the length of the slot from one end thereof to the other.

The cover 35 is spaced from the spool G to permit passage of the line in unwinding from the forward margin of the spool through the grommet J when in its outermost position.

The brake H is designed to normally hold the spool G against rotation when the line guiding grommet J is in its outermost position, and during the casting operation, but is adapted to be manually manipulated to free the spool for the winding operation. To accomplish this the lever 45, which constitutes a brake controlling arm, is mounted on the underside of the saddle 30 and arranged to overlie a horizontally extending member $j$ on the upper portion of the brake H, and is tensioned to normally bear downwardly on the brake so as to move and hold the shoe $f$ thereof into tight frictional engagement with the periphery of the disk $e$. A spring arm 54 on the underside of the lever 45 projects beneath and bears upwardly against the underside of the end portion $j$ of the brake H and exerts an upward thrust thereon to move the brake to its retracted or disengaged position when relieved of pressure of the lever 45.

Manually controlled releasable means are provided for locking the brake H in its engaged position which means embodies a slide 55 mounted on the lever 45 and adapted to be shifted longitudinally thereof in frictional engagement therewith; the slide being fitted with an upstanding lug 56 arranged to be disposed either in or out of engagement with a downwardly extending lug 57 on the under side of the saddle 30 whereby when the lug 56 is positioned beneath the lug 57, the lever 45 is securely held in a lowered position such as to depress the brake H into its spool engaging and locking position.

When it is desired to release the brake H the slide 55 is advanced on the lever 45 to a position where the lug 56 is disposed out of engagement with the lug 57, whereupon a pull is imposed on the lever by the fingers of the hand of the operator grasping the pole on which the reel is mounted. This pull relieves the brake H and causes the spring 54 to actuate the brake to its released position whereupon the spool will be free to rotate in effecting the line winding operation.

In the form of the invention shown in Figs. 1 to 19 inclusive, means are provided for level winding by automatically feeding the line laterally back and forth during the winding thereof on the spool G, which involves a device for shifting the grommet J back and forth along the inner end portion only of the slot 50. This means embodies an arcuate lever K particularly shown in Fig. 18 mounted for lateral oscillatory movement on the outside of the inner marginal portion of the cover 35 by means of a screw pivot 58 mounted on the cover 35 and engaging the lever K intermediate its ends. The outer end of the lever K is designed to be engaged with the grommet J to effect reciprocal movement thereof when disposed at the inner end portion of the slot 50, the lever K being designed to be disengaged from the grommet J to permit movement thereof to and from its outermost or line casting position. To accomplish this the lever K comprises a pair of overlying elongated strips 59 and 60 of which the innermost strip 59 is engaged by the pivot 58 and affords a guiding support for the outer strip 60 which latter is longitudinally shiftable to and from the grommet engaging position. This shifting of the lever strip 60 is effected by manipulating the slide 55; the upper end of the strip 60 being formed with an outwardly projecting tongue 61 which extends between a pair of prongs 62 projecting downwardly from the underside of the slide 55 whereby on shifting the slide longitudinally of the lever 45 longitudinal movement of the strip 60 on the strip 59 will be effected and whereby, when the slide 55 is disposed in its retracted position wherein the lever 45 applies the brake H to condition the reel for a casting operation, the lower end of the lever K will be disposed clear of the grommet J so that the latter may then be moved to and from its outermost position in the slot 50.

The strip 60 is formed at its lower end (which constitutes the lower end of the lever K) with inturned marginal flanges $k$—$k$ adapted to be positioned astride the grommet J when the latter is in its innermost position and when the strip 60 is moved to its advanced position is indicated in Figs. 15 and 17, so as to then effect interconnection between the lower end of the lever K and the grommet J. The lower end of the strip 60 is formed with an open ended longitudinally extending slot $l$ through which the line 52 extends when the lower end of the lever K is engaged with the grommet J.

Oscillation of the lever K is synchronized with rotation of the spool G through mechanism actuated by rotation of the shaft 38. This mechanism embodies a ring $m$ slidably fitted in an eccentric circular cam groove $n$ formed in the forward face of the spur gear $a$. The ring $m$ is affixed to a reciprocal and oscillatory slide bar 63 the outer end of which extends over and adjacent the wall D and is formed with an open ended longitudinal slot 64 in which is engaged a guide pin 65 fixed on the wall D and serving as a pivot on which the lower end portion of the slide bar 63 rocks with a slight oscillatory movement as the slide bar is actuated by rotation of the eccentrically disposed ring $m$. The slide plate 63 is formed with a lateral extension 66 which is connected by a pivot pin 67 to one end of a link 68 carrying a spring pressed pin 69 the outer end of which is formed with a socket 70 in which is engaged an arm 71 on a rock shaft 72 mounted in and extending radially of the wall 35. The outer end of the rock shaft 72 is formed with an arm 73 which extends into an open ended slot 74 formed in a lateral projection 75 on the lever K whereby oscillation of the shaft 72 through the medium of the link and slide plate 63 will be translated into oscillatory movement of the lever K.

The grommet J serves as a means for preventing or at least minimizing the possibility of entanglement of the line within the cover 35 and insures positioning the line for straight winding on the spool G when the grommet is disposed at the inner end of the slot 50 and also insures feeding or unwinding of the line from around the outer end of the spool G in casting operations when the grommet is disposed at the outer end of the slot 50, since the line is at all times bounded by the continuous annular wall of the grommet. The grommet is frictionally engaged at the ends of the slot 50 to hold it against free movement. The grommet further serves as a guard to prevent cutting of grooves in the margin of the slot 50 as would normally be occasioned in the absence of the grommet by the sawing action of the line when contacting the slot margin during a casting or a winding operation. Wear on the grommet is minimized by hardening the metal of which it is formed. However in event of excessive wear of the grommet it may be readily removed and replaced.

The drum 40 of the spool G is fitted with a governor which acts to impose a drag on the drum relative to rotation of the shaft 38. This governor, particularly shown in Fig. 12, embodies a pair of weighted arms 74' carried by pivot pins 75' on the end wall 49 of the drum 40. The inner ends of the arms are fitted with leaf springs 76 which bear on a drum 77 with variable pressure according to the throw of the arms 74' under the action of centrifugal force imposed thereon on rotation of the drum 40.

The spool winding spring 43 is wound and placed under tension by rotation of the drum 44 to which the outer end of the spring 43 is attached. This is accomplished by the provision of an outer drum 78 which slidably conforms to the drum 44 and is ratcheted to the latter by means of a spring pawl o on the margin of the drum 78 which pawl engages ratchet teeth p on a ring q affixed to the perimeter of the drum 44, whereby rotation of the outer drum 78 in one direction will effect rotation of the drum 44 in a direction to wind the spring 43. The drum 78 is formed with a circumferential channel 79 in which is wound a pull cord 80 the inner end of which is affixed to the drum 78 and the other end of which passes through an aperture 81 in the housing 36 and is fitted with a finger piece 82 by means of which the cord 80 may be manually pulled to rotate the drums 44 and 78 collectively to wind the spring 43. Retrograde movement of the spring winding drum 44 is prevented by means of a spring pressed pawl o' carried by the wall D which rides in engagement with ratchet teeth p' on the band q carried by the inner drum 44. While the pawl o engaging the ratchet p affords a driving connection between the outer drum 78 and the inner drum 44 on the former being advanced as by a pull on the pull cord 80, such pawl and ratchet permit retrograde movement of the outer drum 78 relative to the drum 44 in retracting the pull cord 80 and winding it in the groove 79. This retrograde movement of the drum 78 is effected by means of a spiral spring 83 having its outer end affixed relative to the rear housing 36 with its inner end fixed to a ring r fastened to a hub s on the drum 78. The spring 83 is wound and placed under tension on turning the drum 78 through the medium of the pull cord 80 and on release of the latter the spring 83 acts to reverse the direction of rotation of the drum 78 to rewind the pull cord thereon.

The drum 44 embodies an outer end wall s' formed with an outwardly extending hub t into which the outer end of the shaft 38 extends axially of the drum 44 to afford a mounting therefor and for the outer drum 78, the hub s of which encompasses and is revolubly supported on the hub t.

Auxiliary means are provided for effecting rotation of the drum 44 in winding the spring 43 which means comprises a knurled hand wheel L affixed to the hub t by means of a screw u which is threaded in the outer end of the hub t and bears on the hub of the wheel L to clamp the latter into locking engagement with pins y projecting from the end of the hub t.

In the operation of the mechanism, the spring 43 is wound and placed under tension by rotating the drum 44 either by manipulating the pull cord 80, or by means of the hand wheel L. This spring winding operation may be effected at any time it is deemed necessary; it being done before making a cast so as to wind the line on the spool and also being done after making a cast to reel in the line when need be. On the line being reeled on the spool the parts are conditioned in readiness for a casting operation.

In making a cast after winding the spring, as by two or three short pulls on the pull cord, the fisherman adjusts the line until the lure is from six to ten inches from the pole. He then grasps the line with front fingers and thumb with the hand on the pole and little finger on the lever 45. He now moves the slide 55 back on the lever so as to hold the spool against rotation and release the grommet which is then shifted to and snapped in the outer end of the slot 50. The cast is then made. As before stated, previous to effecting the casting operation, the grommet J is released from the lever K by retracting the latter out of engagement therewith whereupon the grommet is disposed in the outer end of the slot 50 so that in making a cast the line will unwind from the end of the spool which is then held stationary by the brake H.

On completing the cast the grommet J is immediately returned to and secured in its innermost position in the slot 50 in position for straight rewinding of the line on the spool. To accomplish this, the lever 45 is released by advancing the slide 55 outwardly thereon which operation brings the lower end of the lever K into engagement with the grommet J which is then disposed at the inner end of the slot 15. The lever 45 is then actuated by the operator to release the brake H, whereupon the spool G will be rotated under the urge of the spring 43 to effect winding of the line on the spool through the then spring driven shaft 38 and the gear connection with the spool. The spring 43 may be rewound as frequently as occasion may require to effect reeling of the line.

In event of excessive pull on the line such as might tend to break it, the annulus 41 will be held by the pull on the line against movement in opposition to the tension thereon afforded by the spring 46 and end cap 47, or the annulus 41 may yield and rotate in the unwinding direction on the drum 40 to feed out the line under heavy pull. This action obviously may occur either while the drum is stationary or being revolved. If need be during the fishing operation, the operator may rewind the spring 43 repeatedly either with the brake applied or released as before stated. During the winding operation the lever K will be oscillated to effect back and forth lateral movement of the grommet and of the line extending therethrough to distribute the line laterally of the spool.

From the foregoing it will be seen that the invention enables the conversion of an automatic fishing reel into a spinning reel in which the line may be fed from the end of a rotatable spool held in a fixed position for a spinning casting operation through the medium of a manually shiftable line guiding grommet fixed in either of two selected positions.

An important feature of the invention resides in the provision of the construction and arrangement whereby direct or straight in winding of the line is effected on the spool of an automatic reel where the only power means of retrieving the line and hauling in a catch is the power of the wound spring which power is quite limited. The straight in winding requires less power than where the line is pulled around bends. At all times the power required is in direct proportion to the diameter of the spool plus the amount of line wound thereon, the power required to wind the line increasing as the diameter of the winding increases. It follows that where the winding is indirect the available power may be inadequate, being possibly double that required in direct straight in winding.

I claim:

1. In a fishing reel embodying a spool adapted to have a fishing line wound thereon, means for rotating same, an extended cover overlying said spool in spaced relation thereto having a slot leading from near the base to the outer part thereof for the reception of a fishing line attached to said spool, the inner end of said slot being positioned for direct winding of said line on said spool; line guide means slidably mounted in said slot for directing said line to selected positions along said slot, manually controlled fastening means detachably engageable with said guide means for holding said guide means near the base of said cover, instrumentalities operated by said fastening means releasably holding said spool against rotation, said line guide means being adapted to move said line in said slot from the base of the cover to the outer part thereof and to support said line in its outer position during a casting operation, said guide means being supported at the outer end of said slot and being returnable with the line to the base of the slot in position for straight line winding of the line on said spool, said line guide means being held in said last named position by said fastening means when said instrumentalities are positioned to permit rotation of said spool.

2. In an automatic spinning fishing reel, a spool adapted to have a fishing line wound thereon, spring operated means for rotating said spool to wind a line thereon, a pull cord arranged to wind said spring means for returning said cord from a projected position to its original position, an extended cover overlying said spool in spaced relation thereto, said cover having a slot extending from near the base to the outer part thereof to receive a fishing line attached to said spool, the inner end of said slot being positioned for direct winding of said line on said spool, line guide means slidably mounted in said slot for directing said line through the slot, means for releasably holding said guide means near the base of said cover, spool locking and releasing means controlled by the reel operator for preventing rotation of said spool when said line holding and guide means is released, said guide means being provided for moving said line in said slot from the base of the cover to the outer part thereof and adapted to support said line in said position during a casting operation, said line guide means being returnable with the line to the base of the slot for straight line winding of said line on said spool, said line guide means being retained in said last named position by said releasable spool holding means when the latter is positioned to release said spool from a locked position to one controlled by said reel operator.

3. In a fishing reel having a revoluble spool adapted to have a fishing line wound thereon, means operatively connected to said spool for rotating same, an extended cover enclosing said spool in spaced relation thereto having a slot extending from near the base to the outer part thereof, a grommet slidably maintained in said slot through which said fishing line is passed, manually controlled means releasably retaining said grommet in position to guide said line on said spool during rotation of said spool, said grommet when released from said means being translatable along said slot to position said line at the outer part of said cover, means retaining said grommet in the outer part of said cover during a casting operation, manually operable means for preventing rotation of the spool during casting operation to effect a spinning cast, said last named means being operable to free said spool for rotation when said grommet is returned to the base of the cover and locked in said position by said manual controlled means.

4. In a fishing reel embodying a supporting wall, a spool revolubly carried on said wall, means carried on said wall by which said spool may be rotated, an extended cover on said wall overlying said spool and having a radial slot therein leading from the inner marginal portion thereof to the outer central portion thereof; a line guiding grommet moveable along said slot from end to end thereof, manually operable slide means for releasably holding said grommet at the inner end of the slot during winding of a line on said spool, and manually controlled means normally holding said spool in fixed relation to said wall and cover while said grommet is disposed away from the inner end of said slot.

5. The structure called for in claim 4 including means for automatically oscillating said grommet holding means when said grommet holding means is engaged with the grommet to feed a line therein to said spool.

6. In a fishing reel embodying a supporting wall, a spool revolubly carried on said wall, means carried on said wall by which said spool may be rotated, an extended cover on said wall overlying said spool having a radial slot therein leading from the inner marginal portion thereof to the outer central portion thereof; means for guiding a line from said spool along the length of said slot, a pole engaging saddle carrying said wall, a brake carried by said wall engageable with said spool for releasably holding it against rotation, spring means carried on said saddle for actuating said brake to its spool holding position, and manually operable means for retracting said brake to its released position.

7. In a fishing line reel embodying a revoluble spool, a spring, a first revoluble drum to which one end of said spring is attached, means connected to the other end of said spring for rotating said spool, ratchet teeth on said drum, and a first pawl engaging said teeth, said first pawl and ratchet operable to confine rotation of said first drum to one direction; an outer drum encompassing said first named drum, a second pawl on said outer drum, the ratchet teeth on said first named drum engaged by said second pawl, whereby rotation of said outer drum will rotate the first named drum to wind said spring, a manually operable pull cord for rotating said outer drum in one direction, and spring means for rotating said outer drum in the other direction to retrieve said pull cord.

8. In a fishing reel embodying a revoluble spool supporting means for said reel, and a cover enclosing said spool having a radial slot; a line guiding grommet slidably engaged in said slot, an oscillatory lever pivoted on said cover, means embodied in said lever movable in and out of engagement with said grommet, and manually operable means carried on said supporting means for actuating said grommet engaging means.

9. In a fishing reel embodying a revoluble spool, supporting means for said reel, and a cover enclosing said spool having a radial slot; a line guiding grommet slidably engaged in said slot, an oscillatory lever pivoted on said cover, a longitudinally movable strip embodied in said lever, grommet engaging means on the outer end of said strip, and manually operable means carried on said supporting means for moving said strip to dispose said grommet engaging means in and out of engagement with said grommet.

10. In a fishing reel embodying a spool, a support for said reel, means for rotating said spool, and an extended cover overlying said spool formed with a radial slot; a line guiding grommet slidable longitudinally of said slot, a lever pivoted on said support having an outer end detachably engageable with said grommet to releasably hold it at one end of said slot, and spool locking means actuated by said lever when in its grommet detached position engageable with said spool rotating means to hold said spool stationary.

References Cited in the file of this patent

UNITED STATES PATENTS

| | | |
|---|---|---|
| 522,064 | Keuffel | June 26, 1894 |
| 2,340,892 | Maynes | Feb. 8, 1944 |
| 2,561,935 | McCash | July 24, 1951 |
| 2,587,462 | Goldberg | Feb. 26, 1952 |
| 2,590,369 | Beeler | Mar. 25, 1952 |
| 2,630,978 | Skarbek | Mar. 10, 1953 |
| 2,723,808 | Elliott et al. | Nov. 15, 1955 |